(12) United States Patent
Lam et al.

(10) Patent No.: US 9,726,274 B2
(45) Date of Patent: Aug. 8, 2017

(54) GEAR MOTOR ASSEMBLY

(71) Applicant: Johnson Electric S.A., Murten (CH)

(72) Inventors: Wing Cheung Lam, Hong Kong (CN); Qiang Xu, Shenzhen (CN); Marlou Tampus Malabo, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 368 days.

(21) Appl. No.: 14/614,035

(22) Filed: Feb. 4, 2015

(65) Prior Publication Data

US 2015/0159744 A1    Jun. 11, 2015

Related U.S. Application Data

(62) Division of application No. 13/732,040, filed on Dec. 31, 2012, now Pat. No. 8,984,980.

(30) Foreign Application Priority Data

Dec. 31, 2011   (CN) .......................... 2011 1 0459370

(51) Int. Cl.
*F16H 57/04* (2010.01)
*F16H 55/22* (2006.01)
*F16C 33/10* (2006.01)

(52) U.S. Cl.
CPC .......... *F16H 57/043* (2013.01); *F16C 33/10* (2013.01); *F16H 55/22* (2013.01); *F16H 57/048* (2013.01); *F16H 57/0471* (2013.01); *F16H 57/0498* (2013.01); *Y10T 74/1987* (2015.01); *Y10T 74/19828* (2015.01); *Y10T 74/19991* (2015.01)

(58) Field of Classification Search
CPC . F16H 57/0471; F16H 57/0498; F16H 57/043
See application file for complete search history.

(56) References Cited

U.S. PATENT DOCUMENTS

| 1,377,866 | A |   | 5/1921 | White |   |
|---|---|---|---|---|---|
| 1,484,635 | A | * | 2/1924 | Francis | ............... F16H 57/0498 |
|   |   |   |   |   | 184/13.1 |
| 1,921,769 | A | * | 8/1933 | Morgan | ............... F16H 57/0456 |
|   |   |   |   |   | 184/27.1 |
| 1,995,288 | A | * | 3/1935 | Acker | ................. F16H 57/0421 |
|   |   |   |   |   | 184/11.1 |

(Continued)

FOREIGN PATENT DOCUMENTS

| CN | 1368606 A | 9/2002 |
|---|---|---|
| CN | 1782452 A | 6/2006 |

*Primary Examiner* — Terence Boes
(74) *Attorney, Agent, or Firm* — Muncy, Geissler, Olds & Lowe, P.C.

(57) ABSTRACT

A gear motor assembly includes a casing having a through hole, a motor fixed to the casing, an output shaft, a gear fixed to the output shaft and driven by the motor, and a substantially tubular bearing fixed in the through hole of the casing. The gear has a central hub which has an axial end surface, and a shaft portion extending from a central portion of the axial end surface of the central hub. The shaft portion is sleeved in the bearing. A slot is formed in the outer surface of the shaft portion and is filled with lubricant. The slot extends from a free end of the shaft portion to a joint between the outer surface of the shaft portion and the axial end surface of the central hub.

20 Claims, 3 Drawing Sheets

(56) References Cited

U.S. PATENT DOCUMENTS

| | | |
|---|---|---|
| 5,836,076 A | 11/1998 | Duta et al. |
| 5,857,318 A | 1/1999 | Odai et al. |
| 6,338,575 B1 | 1/2002 | Chen |
| 2002/0011127 A1 | 1/2002 | Torii et al. |
| 2007/0177833 A1 | 8/2007 | Egami et al. |
| 2013/0167680 A1* | 7/2013 | Lam .................... F16H 57/048 74/467 |

* cited by examiner

GEAR MOTOR ASSEMBLY

CROSS REFERENCE TO RELATED APPLICATIONS

This application is a divisional of co-pending application Ser. No. 13/732,040, filed on Dec. 31, 2012, for which priority is claimed under 35 U.S.C. §120; and this non-provisional patent application claims priority under 35 U.S.C. §119(a) from Patent Application No. 201110459370.8 filed in China on Dec. 31, 2011.

FIELD OF THE INVENTION

The present invention relates to a gear motor assembly and in particular, to a gear motor assembly having a bearing surface with a groove for lubricant.

BACKGROUND OF THE INVENTION

A gear motor assembly for a sunroof usually includes a casing having a through hole, a motor fixed to the casing, a gear housed in the casing, and a bearing fixed in the hole. The gear has a shaft running through the hole and sleeved by the bearing. The shaft couples to the sunroof During operation, the shaft rotates with respect to the bearing. In most gear motor assemblies, the inner wall of the bearing and the outer wall of the shaft are smooth arcuate surfaces. In order to reduce vibration or wobbling of the gear during rotation, the gap between the shaft and the bearing is designed as small as possible which leaves little room for receiving lubricant. Thus, less lubricant can be accommodated in the gap, resulting at times in hard contact between the shaft and the gear during rotation and, therefore, produces a loud noise.

Hence there is a desire for a new gear motor assembly producing less noise during operation.

SUMMARY OF THE INVENTION

Accordingly, in one aspect thereof, the present invention provides a gear motor assembly, comprising: a casing having a through hole; a motor fixed to the casing; an output shaft; a gear fixed to the output shaft and driven by the motor; a substantially tubular bearing fixed in the through hole of the casing and sleeving a shaft potion of the gear; and at least one slot containing lubricant formed in at least one of an inner surface of the bearing and an outer surface of the shaft portion of the gear.

Preferably, the axial length of the at least one slot is not less than the axial length of the bearing.

Preferably, the at least one slot extends in the axial direction of the output shaft.

Preferably, the at least one slot comprises an odd number of slots formed in the outer surface of the shaft portion.

Alternatively, or in addition, the at least one slot comprises an odd number of slots formed in the inner surface of the bearing.

Preferably, the number of slots in the outer surface of the output shaft is not equal to the number of slots in the inner surface of the bearing.

Preferably, the slots are evenly spaced in the circumferential direction of the bearing or output shaft.

In embodiments of the present invention, as the slot is especially formed to receive lubricant, compared to gear motor assemblies of the prior art, less room between the output shaft and the bearing is needed to retain the lubricant.

Therefore, the gear motor assembly is able to reduce friction while maintaining low vibration of the gear during operation. From another aspect, due to the slot extending through the entire bearing, the whole inner surface of the bearing can contact the lubricant, which improves the lubricity.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
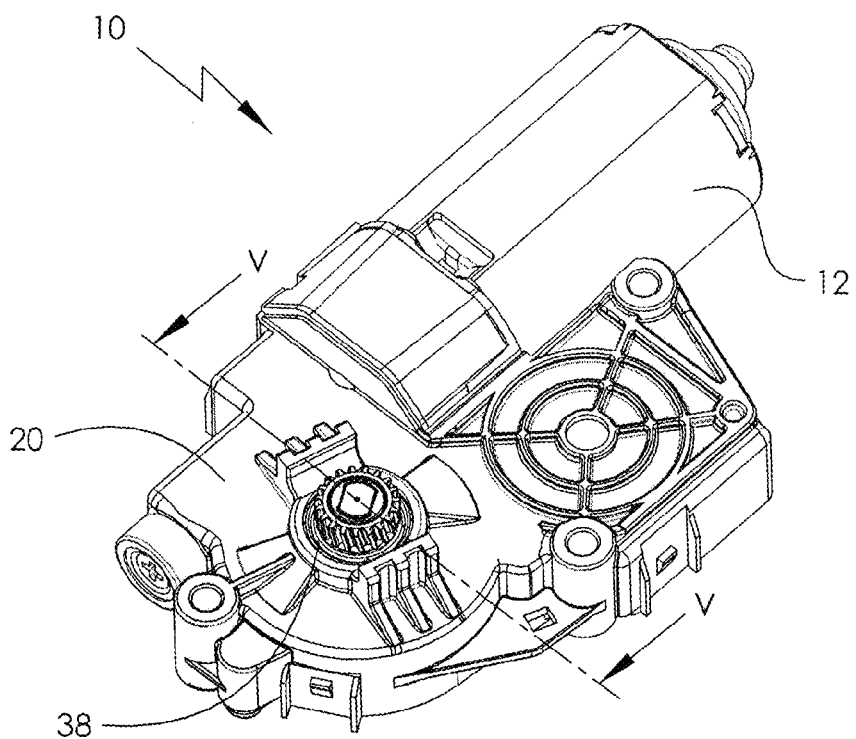
FIG. 1 shows a gear motor assembly in accordance with the preferred embodiment of the present invention.
Figure 2:
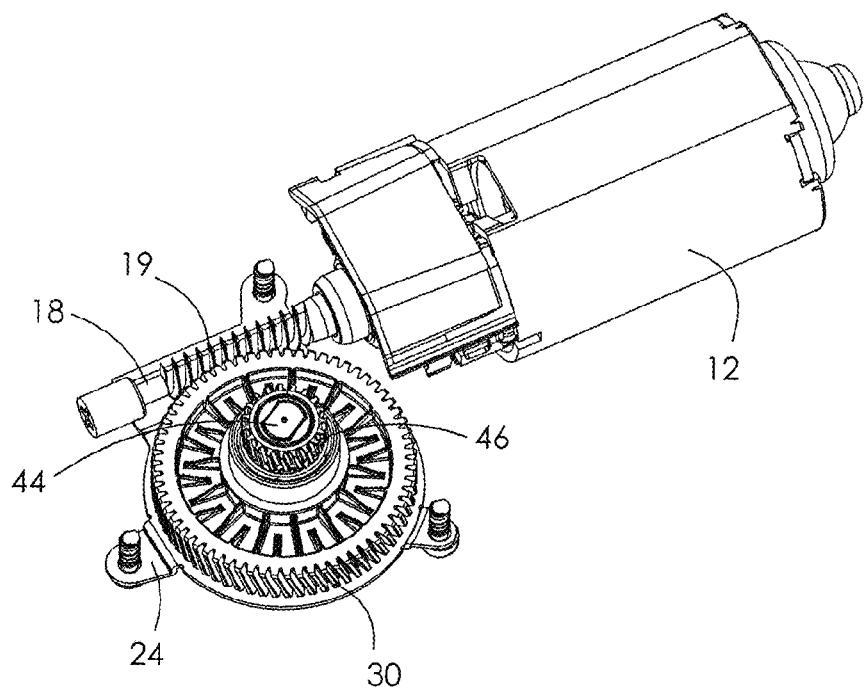
FIG. 2 shows the gear motor assembly of FIG. 1, with part of a casing removed.
Figure 3:
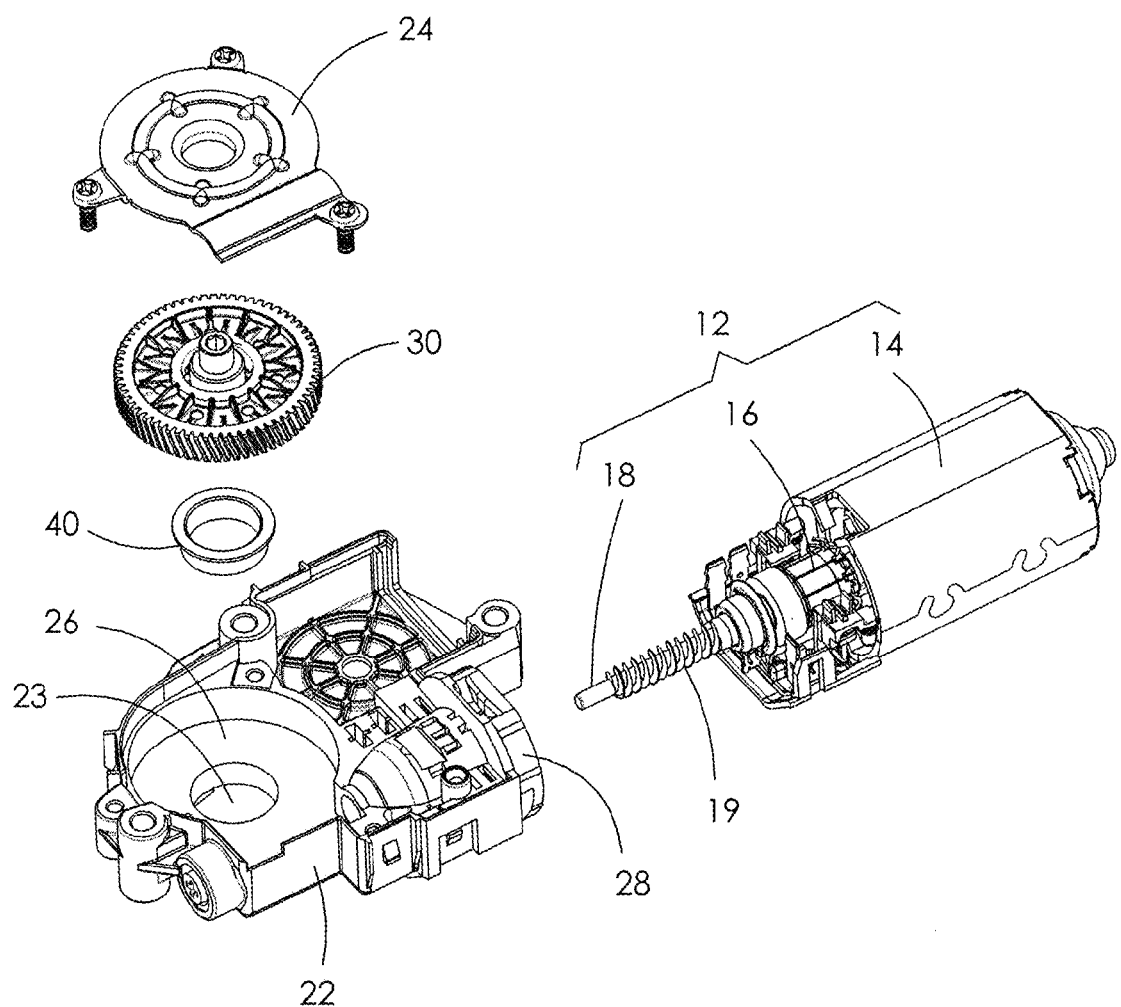
FIG. 3 is an partially exploded view of the gear motor assembly of FIG. 1.

The Figs. show a gear motor assembly 10, according to the preferred embodiment of the present invention, which may be used to drive a sunroof of a vehicle. The gear motor assembly 10 includes a casing 20, a motor 12 fixed to the casing 20, a gear 30 housed in the casing 20 and driven by the motor 12, and a substantially tubular bearing 40 fixed to the casing 20 and in which a shaft portion 34 of the gear 30 is sleeved.

The casing 20 includes a base 22 and a cover 24. The base 22 includes a compartment 26, a connection part 28 for connecting the motor 12, and a through hole 23 formed at the center of a bottom plate of the compartment 26. The cover 24 defines a shaft hole 25 at the center thereof The shaft hole 25 is coaxial with the through hole 23. The cover 24 can be connected to the base 22 by screws.

The motor 12 includes a stator 14 and a rotor 16 received in the stator 14. The rotor 16 includes a motor shaft 18. A worm 19 is formed on the motor shaft. The motor 12 is connected to the casing 20 with the worm 19 of the motor shaft 18 received inside the compartment 26. The connection part 28 of the base 22, forms an end cap for the motor, closing one end of the stator 14.

Figure 4:
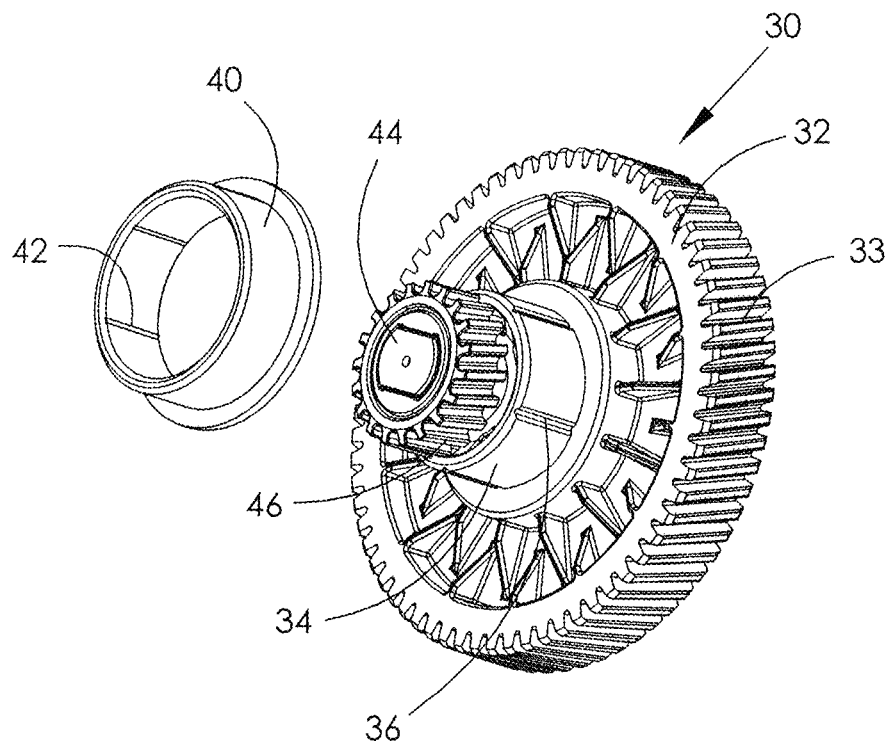
FIG. 4 shows a gear and a bearing of the gear motor assembly of FIG. 1.
Figure 5:
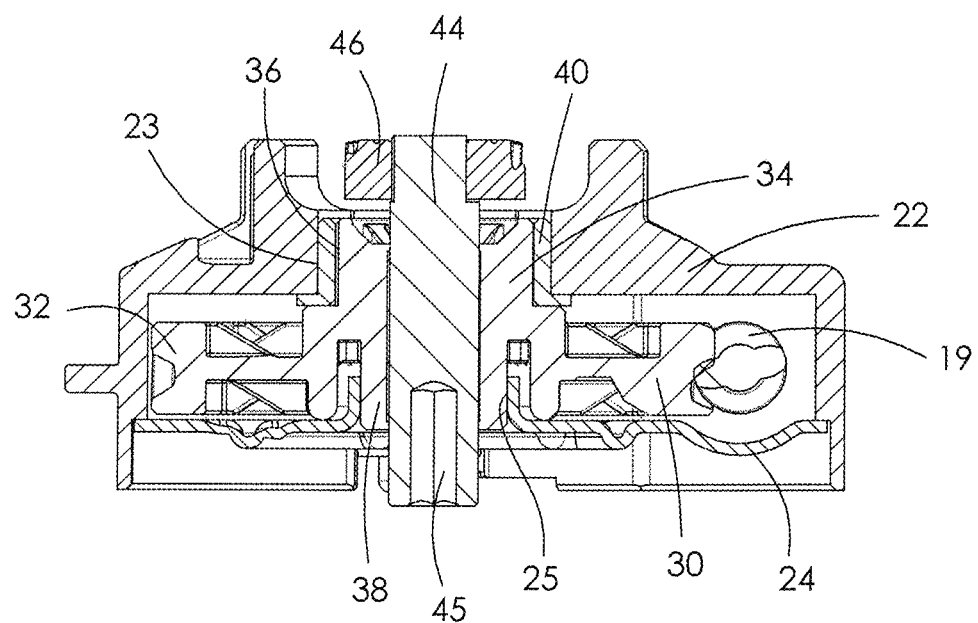
FIG. 5 is a sectional view of the gear motor assembly, sectioned along line V-V of FIG. 1.

The gear 30 is more clearly shown in FIGS. 4 and 5. The gear 30 has a body portion 32 having gear teeth 33, preferably helical gear teeth, formed on a radially outer peripheral surface, arranged to engage the worm of the motor shaft. The gear 30 also has a central hub 31 arranged in a central portion of the gear 30 and spaced from the body portion 32, and a bottom plate 35 connected between the central hub 31 and the body portion 32.

A plurality of first ribs 37 extends from an outer periphery of the central hub 31 towards the body portion 32, with distal ends of the first ribs 37 spaced from the body portion 32. A plurality of second ribs 39 extends from an inner surface of the body portion 32 towards the central hub 31, with distal ends of the second ribs 39 spaced from the central hub 31.

The first ribs 37 and the second ribs 39 strengthen the rigidity of the gear, while reducing vibration transform from the central hub 31 to the body portion 32. Preferably, the first ribs 37 and the second ribs 39 are arranged alternately in a circumferential direction of the gear 30. Each first rib 37 has a height, measured in axial direction of the gear, decreases in a radial direction towards the body portion 32. Likewise, each second rib 39 has a height, measured in axial direction of the gear, decreases in a radial direction towards the central hub 31.

The shaft portion 34 extends from a central portion of an axial end surface 31a of the central hub 31. The shaft portion 34 defines a bearing surface on the outer surface which is sleeved in the tubular bearing 40. The shaft portion 34 has a number of axially extending slots 36 formed in the outer surface. The gear 30 is a molded plastic part which is fixed to an output shaft 44, preferably by insert molding or by being pressed over knurls formed on the shaft. Preferably, the output shaft 44 is of metal. An output cog is fixed to the end of the output shaft adjacent the shaft portion 34. The other end of the output shaft 44 has a hexagonal blind hole 45. In case of an emergency, such as a vehicle power failure, an Allen key may be inserted into the hexagonal hole to manually operate the gear motor assembly to open or close the sun roof Preferably, the axial length of the slots 36 is not less than the axial length of the bearing 40. The slots 36 preferably extend in the axial direction of the shaft portion 34, from a free end of the shaft portion 34 to a joint of the outer surface of the shaft portion 34 and the axial end surface 31a of the central hub 31. The slots 36 are evenly arranged in the circumferential direction of the shaft portion 34. The bearing 40 can be an oil-impregnated sleeve bearing.

During assembly, the bearing 40 is fixed in the through hole 23. The slots 36 are filled with lubricant such as oil or preferably grease. The body 32 of the gear 30 is received in the compartment 26 and engages with the worm 19 of the motor shaft 18. The output cog 46 is passed through the bearing 40 to couple with the sun roof The shaft potion is located or sleeved within the bearing 40. The slots 36 and the lubricant received therein are then surrounded by the bearing 40. Axial end of the bearing 40 is supported by the end surface 31a of the central hub 31. The cover 24 is assembled to the base 22, with a boss 38 of the gear 30 received in the shaft hole 25. As such, the gear 30 can rotate about an axis of the output shaft 44 with respect to the bearing 40. As the slots 36 extends to the axial end surface 31a of the central hub, the lubricant in the slots 36 may spread to the end surface 31a and therefore reduce friction between the axial end of the bearing 30 and the end surface 31 a of the central hub 31.

As diametrically opposite side surfaces of the shaft portion 34 are the positions most likely to deform when the shaft portion 34 is bent, therefore, the number of slots 36 is preferably odd so as not to reduce the diameter of the shaft portion 34 too much where the slot 36 is formed. In the present embodiment, the shaft portion 34 has 5 slots.

Referring to FIG. 4, in the present embodiment, the slots 36 are formed in the shaft portion 34 of the gear 30. It should be understood that, in other embodiments, slots 42 can also be formed in the inner surface of the bearing 40 rather than the outer surface of the shaft portion 34. Optionally, the outer surface of the shaft portion 34 and the inner surface of the bearing 40 are both formed with slots 36 and 42 to fulfill the same lubrication effect. In this arrangement, the number of slots 36 is preferably not equal to the number of slots 42, so that the shaft portion 34 together with the bearing 40 will not be easily bent for the reason described above.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A gear motor assembly, comprising:
a casing having a through hole;
a motor fixed to the casing;
an output shaft;
a gear fixed to the output shaft and driven by the motor, wherein the gear has a central hub which has an axial end surface, and a shaft portion extending from a central portion of the axial end surface of the central hub;
a substantially tubular bearing fixed in the through hole of the casing and sleeving the shaft portion of the gear; and
at least one slot containing lubricant formed in an outer surface of the shaft portion, the at least one slot extending from a free end of the shaft portion to a joint between the outer surface of the shaft portion and the axial end surface of the central hub.

2. The gear motor assembly of claim 1, wherein the axial length of the at least one slot is not less than the axial length of the bearing.

3. The gear motor assembly of claim 1, wherein the at least one slot extends in the axial direction of the output shaft.

4. The gear motor assembly of claim 1, wherein the at least one slot comprises an odd number of slots.

5. The gear motor assembly of claim 4, wherein the slots are evenly spaced in the circumferential direction of the shaft portion.

6. The gear motor assembly of claim 1, wherein the gear further comprises an annular body portion having gear teeth and located at a radially outer side of the central hub, a bottom plate connected between the body portion and the central hub, and a plurality of ribs formed on the bottom plate and extending between the central hub and the body portion.

7. The gear motor assembly of claim 6, wherein the ribs are unconnected to at least one of the central hub and the body portion.

8. The gear motor assembly of claim 7, wherein the plurality of ribs comprise a plurality of first ribs extending from an outer periphery of the central hub, radial distal ends of the first ribs are spaced from the body portion.

9. The gear motor assembly of claim 8, wherein the first rib has a height, measured in an axial direction of the gear, decreases in a radial direction towards the body portion.

10. The gear motor assembly of claim 8, wherein the plurality of ribs comprise a plurality of second ribs extending from the inner surface of the body portion, distal ends of the second ribs are spaced from the central hub.

11. The gear motor assembly of claim 10, wherein the second rib has a height, measured in an axial direction of the gear, decreases in a radial direction towards the central hub.

12. The gear motor assembly of claim 10, wherein the first ribs and the second ribs are arranged alternately in a circumferential direction of the gear.

13. A gear comprises:
a central hub having an axial end surface;
a shaft portion extending from a central portion of the axial end surface of the central hub;
at least one slot for containing lubricant formed in an outer surface of the shaft portion, the at least one slot extending from a free end of the shaft portion to a joint between the outer surface of the shaft portion and the axial end surface of the central hub.

14. The gear of claim 13, wherein the at least one slot extends in the axial direction of the shaft portion.

15. The gear of claim 13, wherein the at least one slot comprises an odd number of slots.

16. The gear of claim 15, wherein the slots are evenly spaced in the circumferential direction of the shaft portion.

17. The gear of claim 13, further comprising an annular body portion having gear teeth and located at a radially outer side of the central hub, a bottom plate connected between the body portion and the central hub, and a plurality of ribs formed on the bottom plate and extending between the central hub and the body portion, wherein at least a portion of the plurality of ribs are unconnected to at least one of the central hub and the body portion.

18. The gear of claim 17, wherein the plurality of ribs comprise a plurality of first ribs extending from an outer periphery of the central hub, radial distal ends of the first ribs are spaced from the body portion.

19. The gear of claim 18, wherein the plurality of ribs comprise a plurality of second ribs extending from the inner surface of the body portion, distal ends of the second ribs are spaced from the central hub.

20. The gear of claim 19, wherein the first ribs and the second ribs are arranged alternately in a circumferential direction of the gear.

* * * * *